United States Patent
Kuhmichel et al.

(10) Patent No.: US 10,179,419 B2
(45) Date of Patent: Jan. 15, 2019

(54) METHOD AND FOOD SLICING DEVICE WITH CUTTING FORCE DETERMINATION

(71) Applicant: Weber Maschinenbau GmbH Breidenbach, Breidenbach (DE)

(72) Inventors: Christoph Kuhmichel, Bad Berleburg (DE); Volkan Yokaribas, Breidenbach (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 100 days.

(21) Appl. No.: 14/108,770

(22) Filed: Dec. 17, 2013

(65) Prior Publication Data

US 2014/0165803 A1 Jun. 19, 2014

(30) Foreign Application Priority Data

Dec. 19, 2012 (DE) .................. 10 2012 024 947

(51) Int. Cl.
*B26D 5/00* (2006.01)
*B26D 1/00* (2006.01)
(Continued)

(52) U.S. Cl.
CPC .............. *B26D 5/086* (2013.01); *B26D 5/00* (2013.01); *G01L 1/22* (2013.01); *B26D 2210/02* (2013.01);
(Continued)

(58) Field of Classification Search
CPC ........ B26D 2210/02; B26D 1/16; B26D 5/00; B26D 5/007; B26D 7/22; B26D 7/225;
(Continued)

(56) References Cited

U.S. PATENT DOCUMENTS 4,201,101 A * 5/1980 Gerber ..................... B26D 5/00
83/174
6,761,615 B2 * 7/2004 Cohen ................. B23D 59/001
451/10
(Continued)

FOREIGN PATENT DOCUMENTS

DE 4336955 A1 5/1995
DE 102004040427 A1 2/2006
(Continued)

OTHER PUBLICATIONS

DE202009005394 english translation; Aug. 2009 Muller Martini Buchtechnogie.*
(Continued)

*Primary Examiner* — Laura M Lee
(74) *Attorney, Agent, or Firm* — Brooks Kushman P.C.

(57) ABSTRACT

The disclosure relates to a method for operating a food slicing device in which a food cutting blade is controlled by a sensor, and a device for cutting food. The sensor is used to control the cutting operation of the device. When the sensor senses that the cutting blade is worn, a signal is sent to the apparatus motor to increase cutting force. When the senor detects the consistency and content of the material to be cut, a suitable cutting blade, rotation speed and force can be selected. The sensor can also determine the cutting quality of a cutting blade across its circumference by determining the localized bluntness of the blade edge.

18 Claims, 4 Drawing Sheets

(51) Int. Cl.
*B26D 5/08* (2006.01)
*G01L 1/22* (2006.01)

(52) U.S. Cl.
CPC .............. *Y10T 83/04* (2015.04); *Y10T 83/175* (2015.04); *Y10T 83/541* (2015.04)

(58) Field of Classification Search
CPC ....... B26D 7/24; Y10T 83/088; Y10T 83/089; Y10T 83/175; Y10T 83/18; B23D 59/001
USPC .............................. 83/932, 62.1, 76.6–76.9
See application file for complete search history.

(56) References Cited

U.S. PATENT DOCUMENTS

| | | | | |
|---|---|---|---|---|
| 2011/0232440 | A1* | 9/2011 | Weber | B26D 7/01 83/34 |
| 2011/0296964 | A1* | 12/2011 | Muller | B26D 1/0006 83/23 |
| 2012/0048078 | A1* | 3/2012 | Weber | B26D 1/143 83/13 |
| 2012/0060659 | A1* | 3/2012 | Weber | B26D 1/143 83/13 |

FOREIGN PATENT DOCUMENTS

| | | |
|---|---|---|
| DE | 202009005394 U1 | 7/2009 |
| DE | 102009011860 A1 | 9/2010 |
| DE | 102012200852 A1 | 7/2013 |
| EP | 2368677 A1 | 9/2011 |
| EP | 2422940 A1 | 2/2012 |
| JP | H0557684 A | 3/1993 |
| NZ | 518839 A | 12/2004 |
| SU | 1465106 A1 | 3/1989 |
| WO | WO-2012/144048 A1 | 10/2012 |

OTHER PUBLICATIONS

JP05-057684 English Translation; Shokuhin Kikai; Mar. 9, 1993; Japan.*

* cited by examiner

METHOD AND FOOD SLICING DEVICE WITH CUTTING FORCE DETERMINATION

CROSS-REFERENCE TO RELATED APPLICATIONS

This application claims priority to German Patent Application No. 10 2012 024 947.0 filed on Dec. 19, 2012, which is hereby incorporated by reference in its entirety.

TECHNICAL FIELD

The disclosure relates to a method for operating a food slicing device in which a sensor device with a sensor is provided. The cutting blade is used for slicing a food product resting on a cutting bed.

BACKGROUND

DE 10 2009 011 860 discloses a cutting device comprising a detection device for detecting oscillations generated by the rotating blade. The detection device operates In particular with a structure-borne sound sensor which is attached in the region of a blade edge, or a support structure for said blade edge, respectively.

Structure-borne sound sensors can be formed as oscillation speed sensors or as oscillation displacement sensors. Detecting a structure-borne sound is suitable for being able to adjust a cutting gap.

However, this disclosure is not geared towards adjusting a cutting gap. It has the object to evaluate the cutting quality of the cutting blade and the cutting process in order to achieve optimization.

SUMMARY

This object is satisfied according to the disclosure, in that a cutting force being applied by the cutting blade via the food product onto the cutting bed is determined using the sensor device.

The sensor device is used, inter alia, for detecting blade wear. If a blade becomes blunt in the course of its use, then the cutting force increases, which can according to the disclosure be determined by the sensor device.

Moreover, the disclosure can also aid in the selection of different cutting blades. Depending on the type, consistency and content of material to be cut, different cutting blades can be employed. The sensor device according to the disclosure can consequently be used to determine an optimal cutting blade.

The same applies to determining the optimal blade rotation speed. Here as well, the sensor device according to the disclosure can be of good services.

In addition, the disclosure can be used to identify process errors during slicing, or to determine deviations from operating parameters.

The quality when slicing in particular food products also depends on ambient parameters, namely in particular, the temperature of the food product, the temperature of the processing room, and the humidity of both the product as well as the processing room. These parameters can be recorded with the aid of the sensor device according to the disclosure.

Finally, it is also possible to determine the cutting quality of a cutting blade across its circumference. In particular, localized bluntness of the blade edge of a cutting blade can be determined.

In an advantageous development of the disclosure, it is provided that the sharpness of the cutting blade can be calculated or derived, respectively, from the cutting force being determined by the sensor device This also applies to determining the blade geometry, this can as well be determined according to the disclosure.

It is advantageous if the curve of the cutting force over time can be stored in an EDP-system of the sensor device. This EDP-system can subsequently be used for evaluation.

Remaining service life of the cutting blade can advantageously also be determined in dependency of the determined cutting force with the aid of the disclosure. It is also conceivable to determine the remaining service life of the cutting blade in dependency of the curve of the determined cutting force over time.

The sensor device can take into account product-specific data regarding the food product, and/or the temperature/humidity conditions of the material to be cut or of the processing room, and/or parameters of the cutting blade, respectively.

At least one operating parameter of the slicing device can be set in dependency of the curve of the determined cutting force. This applies in particular to the position of the blade and/or the cutting bed, but also to the choice of cutting speed and/or the feed rate.

Load spectrums can advantageously be determined in a computer-aided manner using peak loads and/or load profiles over time that are determined by the at least one sensor, which are used to determine values regarding the life span or maintenance intervals of wear and tear parts, in particular of bearings of shafts or parts of the drive.

Based on the peak loads and/or load profiles over time, the method of linear damage accumulation can be used to obtain information on the life expectancy of components under stress.

Linear damage accumulation takes into account that a component is normally subjected to not only an oscillating load with constant amplitudes, i.e., a rectangular load spectrum as used for example in the S-N fatigue test, but that the load intensity varies in it height. To calculate the life span, the amplitude spectrum is divided into individual rectangular spectra with a constant amplitude $S\_a$ and a partial number of fatigue cycles to failure $n\_i$ (stepped). According to the method of linear damage accumulation, a partial damage is now calculated for each partial spectrum in that the partial number of fatigue cycles to failure is divided by the maximum tolerable number of fatigue cycles to failure $N\_i$ at $S\_a$ of an S-N curve. The partial damages of all partial spectrums are added and deliver the total damage D of the component via $D=SUM (n\_i/N\_i)$. If the damage exceeds the value 1, it is to be expected that the component will break or crack under the load spectrum examined.

According to the linear damage accumulation, it is in particular irrelevant at which stress level a certain fraction of the maximum tolerable number of cycles to failure was spent. The damage to a partial spectrum I can be converted into that of a different partial spectrum j by dividing the respective partial numbers of cycles to failure n by the maximum tolerable numbers of cycles to failure N ($n\_i/N\_i=n\_j/N\_j$).

If one imagines a two-stage stress, then it is according to the linear damage accumulation irrelevant in which sequence the stresses occur. Sequence effects can therefore not be explained.

Using this method and corresponding data recording, life span can now be predicted for all machine components. It is thereby possible to take preventive influence on system availability of the food slicing device. This means higher availability and a higher degree of efficiency for the food slicing device.

The sensor device can be provided, for example, at the cutting bed itself or its support. Furthermore, it is conceivable to arrange it at the blade head or its mounting support, respectively. It is also conceivable to provide a sensor at the cutting bed or its support, respectively, and at the blade head or it's mounting, respectively, and take a combined measurement.

Strain gauges or piezoelectric crystal elements are possible sensors as pressure sensors, without the disclosure being restricted thereto, It is also conceivable to use other sensors, e.g. accelerometer sensors that are designed such that the force exerted by the cutting blade onto the food product is determined from the measured acceleration value using the known elasticities and masses of the food slicing device. It is therefore also conceivable to determine by means of the sensor device the direction of the forces applied in two linearly independent directions, for example, in a horizontal and a vertical direction.

An embodiment of the disclosure is explained below using the figures.

DETAILED DESCRIPTION

Figure 1:
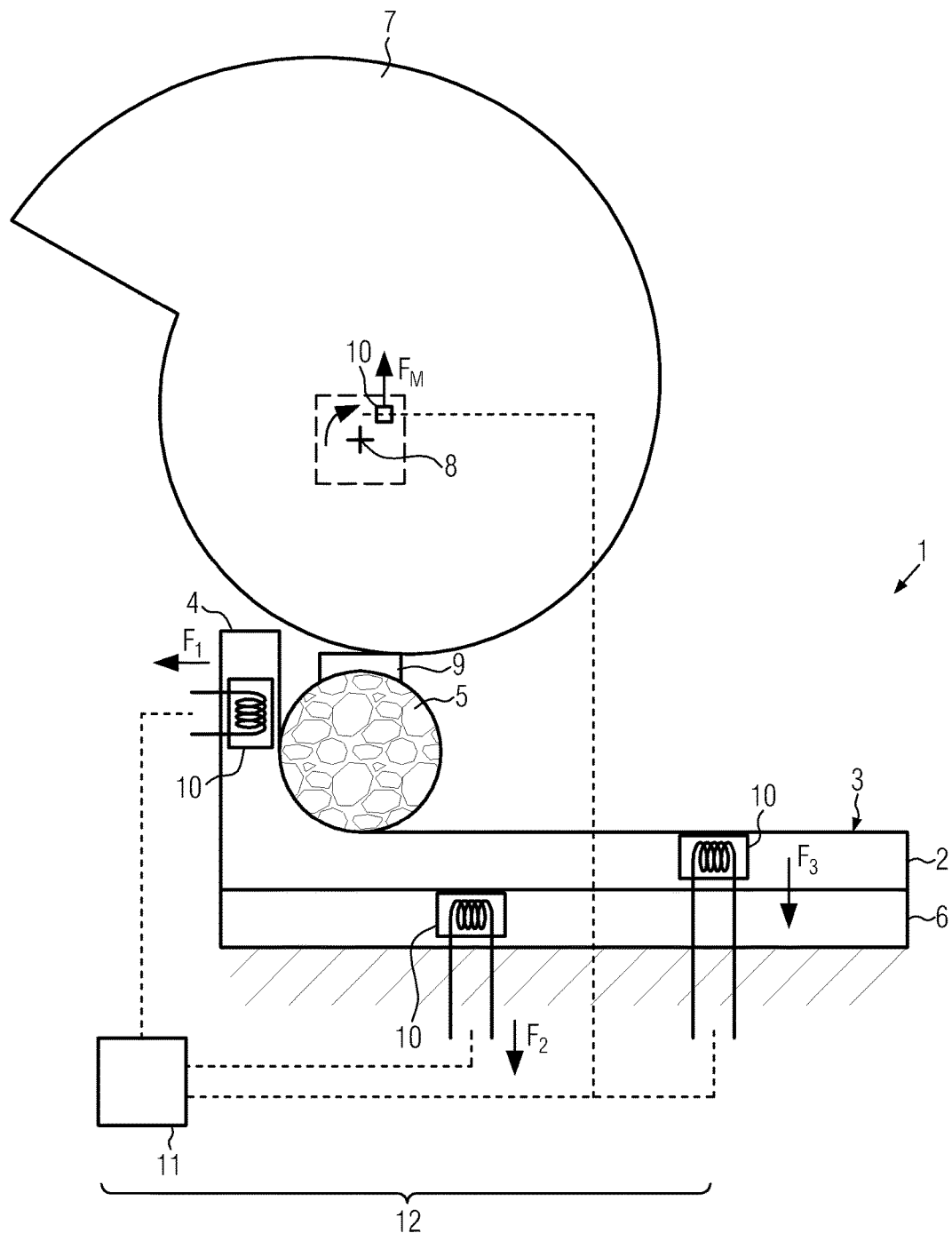
FIG. 1 schematically shows a front view of a first food slicing device.

In the embodiment shown, the device 1 comprises a cutting bed 2 having a horizontal bearing surface 3 and a vertical side support 4. Both are arranged at right angles to each other and, for example, integrally connected to each other.

A food product 5, presently a sausage with a circular cross section, rests on the bearing surface 3 and laterally contacts the support 4, so that the sausage is positioned exactly in the corner between the bearing surface and the support. The connection between the bearing surface and the support can there be rounded.

Below the cutting bed 2 is a cutting bed support 6 which serves as a mounting for the cutting bed. It can be fixed in a stationary manner.

The cutting bed 2 is associated with a cutting blade 7 that rotates about an axis 8. In the case illustrated, the cutting blade is a sickle blade, the blade edge of which at the perimeter comprises a varying distance to the cutting axis. During rotation of the cutting blade, the cutting blade penetrates into the material to be cut and with the blade edge crosses the entire cross-sectional area of the material to be cut, presently the food product 5. In the case illustrated, the cutting blade rotates in a clockwise direction.

The cutting blade 7 is positioned with its axis 8 such that the food product resting on the cutting bed is during the cutting process pressed into the angular arrangement of the cutting bed.

To be able to sever slices in succession from the food product, the product is subjected to a certain feed motion feed which, for example, occurs continuously during cutting. This can be effected in that the food product 5 is conveyed in the forward direction on the cutting bed by a feed element 9.

The cutting blade is with its cutting plane positioned slightly in front of the cutting bed 2 so that it sweeps by the front side of the cutting sample during the cutting process and severs a slice from the food product 5.

Sensors 10 can be arranged in the cutting bed 2 to determine the cutting force of the cutting blade. These sensors can be disposed at appropriate locations of the cutting bed 2, or the cutting bed support 6, for example, in the area of the support 4, the bearing surface 3 or—as already mentioned—on the support 6 for the cutting bed. Furthermore, it is conceivable to associate a plurality of sensors to the cutting blade 7 itself, for example, on the blade head, on the axis 8 at the drive shaft of the cutting blade, or at the mounting of the cutting blade.

These sensors can be associated with an EDP-system 11 which comprises, for example, a memory and an evaluation unit.

The sensor device 12 according to the disclosure can comprise one or more of the aforementioned sensors 10. The position and the number of sensors 10 is determined by the desired recording quality and the optimum placement of these sensors.

The sensor device is used to determine the cutting force being applied during the slicing of the food product by the cutting blade 7 via the food product 5 onto the cutting bed 2. By determining the cutting force, conclusions can be drawn regarding the sharpness of the cutting blade. This is done by comparison of reference data that are determined, for example, by empirical tests. Possible blade wear, which can also be given across only part of the blade perimeter, can thereby be determined.

Furthermore, determination of the cutting force can serve to perform a selection among different cutting blades, namely in regard to the material itself to be cut. The latter will usually vary greatly, depending on whether it is meat, sausage, cheese or other material to be cut. The consistency and the internal structure of the material to be cut are also decisive for the quality of the slicing. The optimum blade speed can likewise be determined. The EDP-system of the sensor device can be used for illustrating the curve of the cutting force over time, and to draw conclusions therefrom for the optimal design of the blade, its rotational speed, the remaining service life in dependency of the wear already experienced etc.

Since the EDP-system creates the possibility to store and evaluate the cutting performance over time, process errors during slicing and deviations from operating parameters can also be recorded.

Furthermore, it is possible to determine the influences of ambient conditions during slicing, such as moisture, temperature and elasticity of the material to be cut and the room conditions of the processing room.

The forces measured during the cutting process by the sensor device can also during operation of the device serve to adjust operating parameters, meaning to reset them. This pertains in particular to the position of the cutting blade relative to the food product, or the cutting bed, respectively. This additionally pertains, for example, to the position of the food product on the cutting bed. This can furthermore pertain to the cutting speed of the cutting blade, the rotational speed thereof, and to the feed motion.

In the drawing, for example, forces $F_1$, $F_2$ and $F_M$ are shown. $F_1$ represents the horizontal force that is detected by the sensor located in support 4. $F_2$ determines, for example, the vertical force $F_2$ arising in support 6. The same applies to the sensor 10 that is arranged below the bearing surface 3. It also determines vertical forces $F_3$.

Force $F_M$ symbolizes the force which is determined by the blade head during the cutting operation. It provides a counterforce to the force acting upon the cutting bed.

Strain gauges can for instance be used as sensors. Accelerometer sensors are also conceivable which determine the force being exerted by the cutting blade 7 onto the food product 5 from the measured acceleration value using the known elasticities and masses of the food slicing device.

In addition, pressure or force sensors are conceivable that transform the signals detected into electric values and forward them.

These sensors can use physical capacitive or piezoelectric effects.

Figure 2:
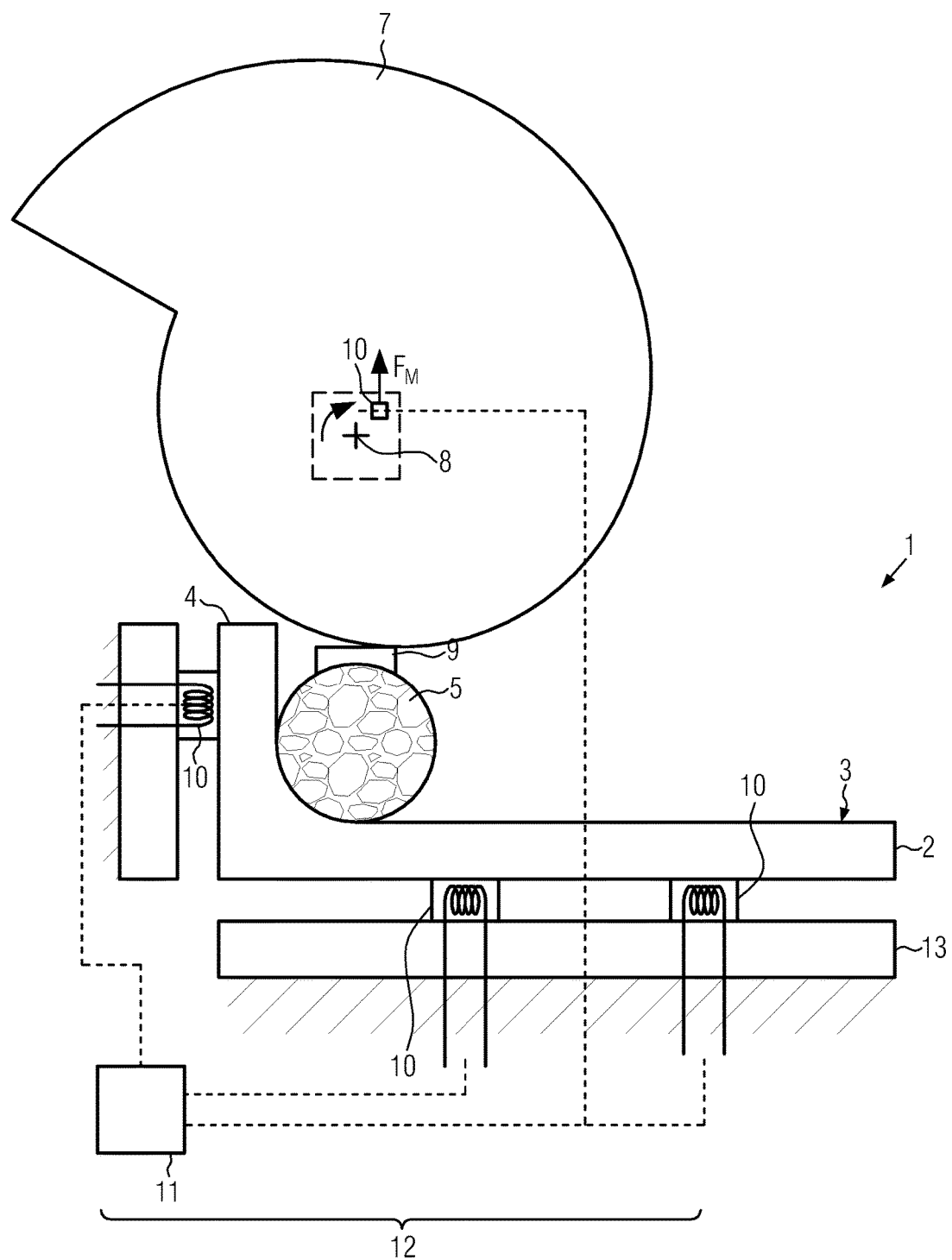
FIG. 2 shows a front view of a further embodiment of the disclosure, in which one or more sensors can be disposed between the support surfaces and the cutting bed.

In the embodiment of FIG. 2, sensors, for example, force or pressure sensors can be disposed between the cutting bed and 2 and the support surfaces 13. They can be associated with the cutting bed and also be oriented e.g. horizontally or also vertically.

Figure 3:
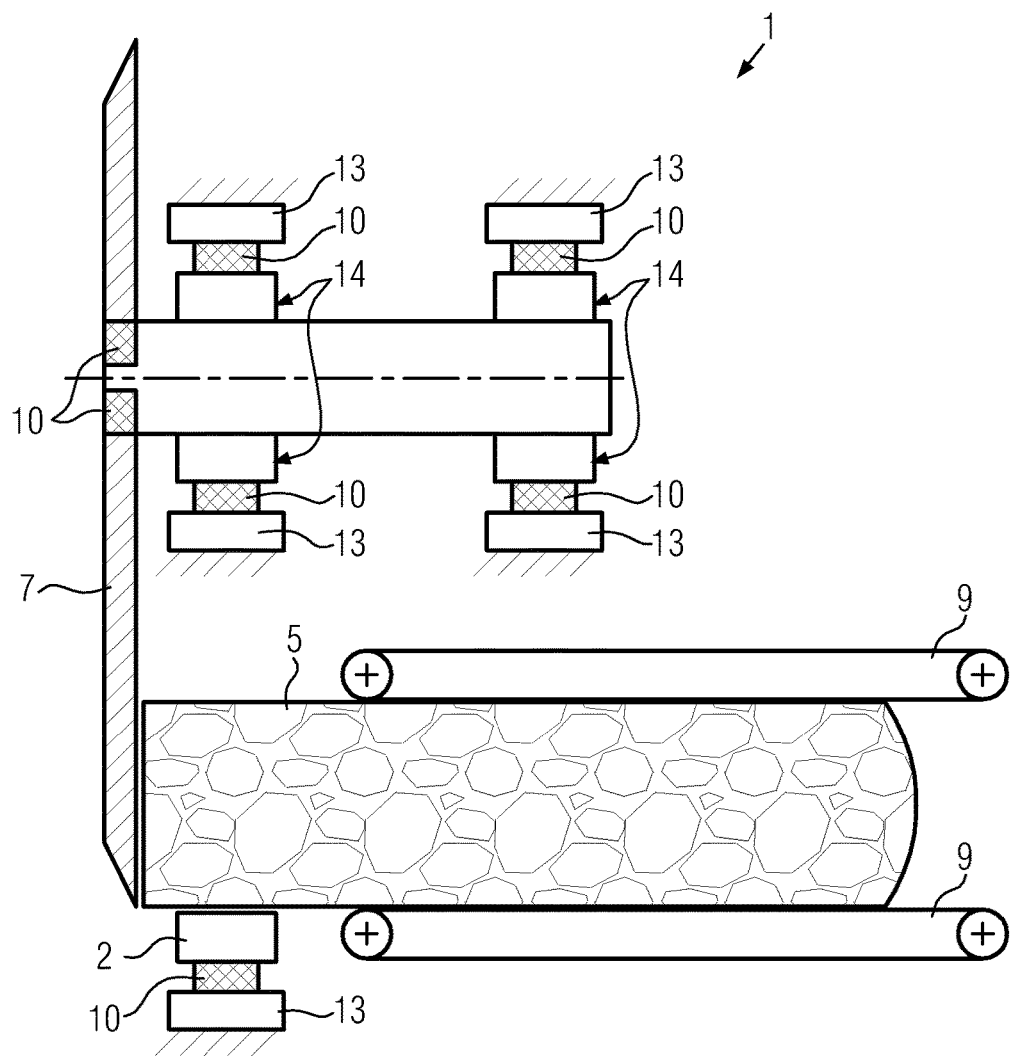
FIG. 3 shows a side view of a further embodiment of the disclosure, in which sensors are disposed in the region of the blade head, e.g. between the blade and the blade mounting.

In the embodiment of FIG. 3, the food product is located between two conveyor belts 5 that together form the feed element 9. Upstream of this element is the cutting bed 2. Between it and a support surface 13, a sensor 10 is arranged which, for example, records the vertical forces.

Alternatively or cumulatively, respectively, it is also possible to arrange at least one sensor in the blade mounting itself, as can be seen from the partial sectional view of the blade. The sensors can, for example, be arranged at the front end of the axis 8 associated with the cutting blade.

It is also conceivable to accommodate them within the mounting assembly 14.

Figure 4:
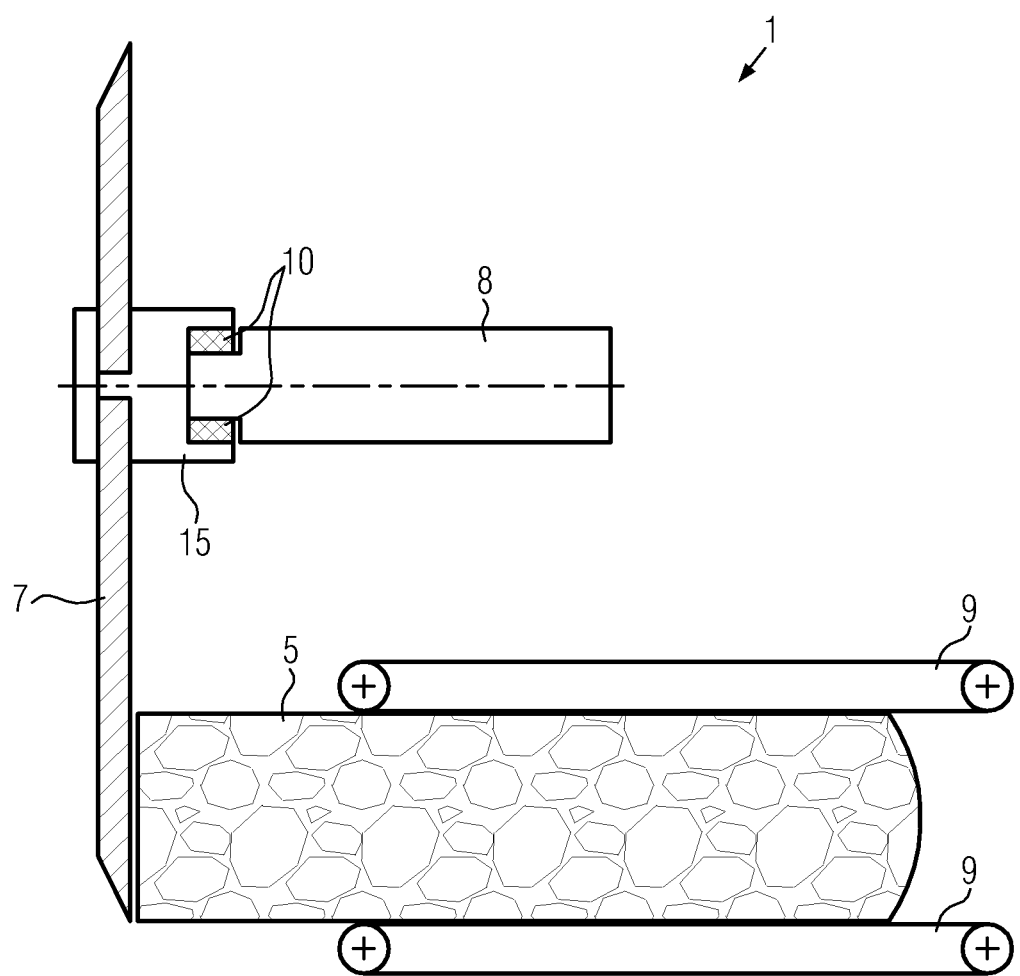
FIG. 4 shows a side view of a further embodiment in which sensors are disposed between the blade mounting and a blade shaft.

FIG. 4 shows a similar solution. The cutting blade 7 comprises a blade mounting 15. Sensors 10 can also be disposed between the latter and the blade shaft 8.

The invention claimed is:

1. A method for operating a food slicing device including a sensor device having a plurality of sensors, the method comprising:
   slicing, with a rotating cutting blade, a food product resting on a cutting bed; and
   sensing, with first and second sensors of said sensor device, forces exerted in two linearly independent directions, wherein said first sensor is on an upright portion of said cutting bed, and said second sensor is on a laterally extending portion of said cutting bed, and wherein said upright portion extends above said laterally extending portion;
   determining a cutting force exerted by said cutting blade via said food product onto said cutting bed based on said sensed forces, wherein blade sharpness of said cutting blade is identifiable based on said cutting force.

2. The method according to claim 1 further comprising determining said cutting force by said sensor device, and identifying blade geometry of said cutting blade from said determination of said cutting force by said sensor device.

3. The method according to claim 1 further comprising storing a curve of said cutting force over time in an electronic data processing system of said sensor device.

4. The method according to claim 1 further comprising determining a remaining service life of said cutting blade in dependency of said determined cutting force.

5. The method according to claim 1 further comprising determining a remaining service life of said cutting blade in dependency of a curve of said determined cutting force over time.

6. The method according to claim 1 further comprising setting at least one operating parameter of said food slicing device in dependency of a curve of said determined cutting force.

7. The method according to claim 6, wherein said at least one operating parameter comprises at least one of blade position, cutting blade speed, cutting bed position, or feed rate of said food product.

8. The method according to claim 1 further comprising determining load spectrums in a computer-aided manner using peak loads and/or load profiles over time that are determined by said sensor device, which load spectrums are used to determine values regarding the life span or maintenance intervals of wear and tear on parts.

9. The method of claim 8, wherein said parts are bearings of shafts or drive parts.

10. A food slicing device for a food product comprising:
    a cutting bed for receiving the food product, said cutting bed having a laterally extending portion and an upright portion that extends above said laterally extending portion;
    a rotatable cutting blade for slicing the food product; and
    a sensor device that includes a plurality of sensors, said plurality of sensors including first and second sensors configured to sense forces exerted in two linearly independent directions, wherein said sensor device is configured to determine a cutting force exerted by said cutting blade via the food product onto said cutting bed during a slicing operation based on said sensed forces, wherein said sensor device is configured to determine blade sharpness of said cutting blade based on said determined cutting force, and wherein said first sensor is on said upright portion of said cutting bed, and said second sensor is on said laterally extending portion of said cutting bed.

11. The food slicing device according to claim 10, where at least one sensor of said plurality of sensors of said sensor device is provided at a cutting bed support.

12. The food slicing device according to claim 10, where said cutting blade is mounted at a blade head and one of said plurality of sensors of said sensor device is provided at said blade head.

13. The food slicing device according to claim 10 wherein at least one sensor of said plurality of sensors comprises at least one strain gauge.

14. The food slicing device according to claim 10 wherein at least one sensor of said plurality of sensors is an accelerometer sensor and said sensor device is configured to determine force exerted by said cutting blade onto said food product from a measured acceleration value using the known elasticities and masses of said food slicing device.

15. The food slicing device of claim 10,
    characterized in that
    at least one sensor of said sensor device is arranged at a blade mounting.

16. The food slicing device of claim 10, characterized in that at least one sensor of said plurality of sensors of said sensor device is arranged between a blade mounting and a drive shaft.

17. The food slicing device of claim 10, characterized in that at least one sensor of said plurality of sensors of said sensor device is arranged between said cutting bed and at least one associated bearing surface.

18. A method for operating a food slicing device including a sensor device having multiple sensors, the method comprising:
- slicing, with a rotating cutting blade, a food product resting on a cutting bed of the food slicing device;
- sensing, with first and second sensors of the sensor device, forces exerted in two linearly independent directions during the slicing;
- determining, using the sensor device, a cutting force exerted by the cutting blade onto the cutting bed via the food product based on the sensed forces; and
- determining blade sharpness of the cutting blade based on the cutting force;
- wherein the first sensor is on an upright portion of the cutting bed, and the second sensor is on a laterally extending portion of the cutting bed, and wherein the upright portion extends above the laterally extending portion.

* * * * *